Figure 1:
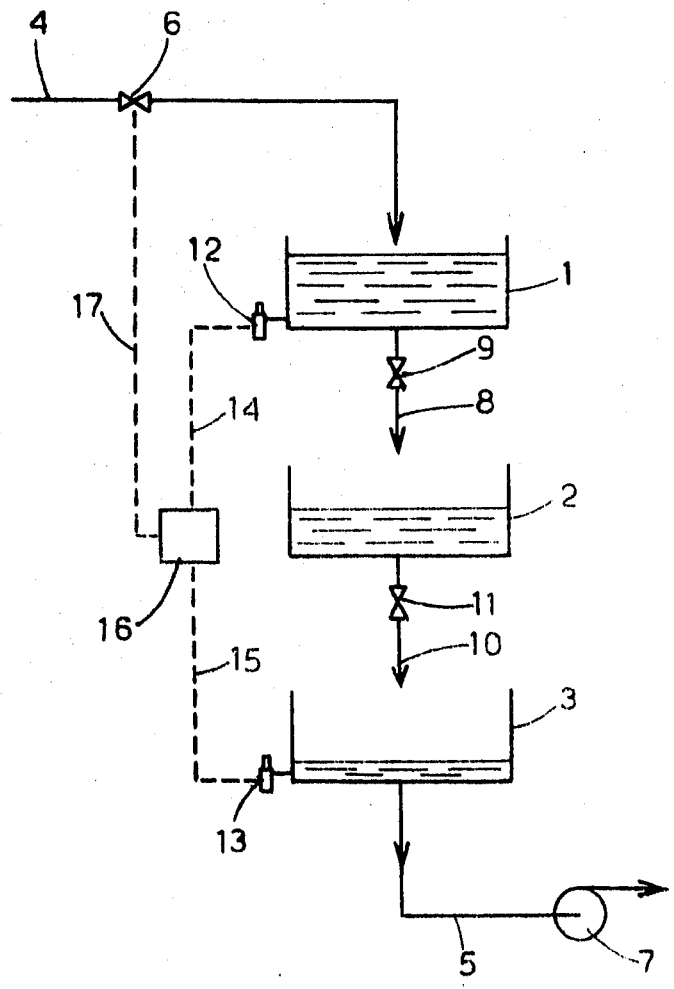

United States Patent

[11] 3,589,389

[72] Inventor Vilgot Raymond Nilsson
   Hagersten, Sweden
[21] Appl. No. 799,686
[22] Filed Feb. 17, 1969
[45] Patented June 29, 1971
[73] Assignee Alfa-Laval AB
   Tumba, Sweden
[32] Priority Feb. 21, 1968
[33] Sweden
[31] 2231

[54] METHOD AND SYSTEM FOR MAINTAINING EQUAL AND CONTINUOUS FLOWS OF LIQUID TO AND FROM INTERMITTENTLY OPERATING APPARATUS
4 Claims, 2 Drawing Figs.

[52] U.S. Cl. .................................................. 137/403, 137/571
[51] Int. Cl. .................................................. F16r 31/12
[50] Field of Search ........................................... 137/8, 396, 402, 403, 571, 575; 222/55

[56] References Cited
UNITED STATES PATENTS

| | | | |
|---|---|---|---|
| 2,899,969 | 8/1959 | Kirby | 137/403 X |
| 3,051,192 | 8/1962 | Fagot et al. | 137/403 X |
| 3,058,043 | 10/1962 | Schroeder | 137/403 X |
| 3,219,046 | 11/1965 | Waugh | 137/8 |

Primary Examiner—Alan Cohan
Assistant Examiner—David R. Matthews
Attorney—Davis, Hoxie, Faithfull & Hapgood ABSTRACT: A receiving container intermittently supplies liquid to a unit, and a discharging container collects and discharges liquid intermittently leaving this unit. Means are provided for adding values corresponding to the liquid quantities in the respective containers, and possibly in the unit also, to obtain a total value dependent upon the sum of these quantities; and the flow of liquid supplied to the receiving container or discharged from the discharging container is regulated to arrest changes in said total value, thereby equalizing the flows of liquid to the receiving container and from the discharging container.

METHOD AND SYSTEM FOR MAINTAINING EQUAL AND CONTINUOUS FLOWS OF LIQUID TO AND FROM INTERMITTENTLY OPERATING APPARATUS

Installations intended for continuous throughflow of a liquid must sometimes include apparatus which operates intermittently, that is, which receives or discharges liquid intermittently. It has long been an unsolved problem how to maintain equal and continuous flows of liquid to and from a discontinuously working apparatus of this kind.

It was found long ago that any solution to this problem requires that the discontinuously working apparatus be provided with one container for continuously receiving liquid supplied to the apparatus and with another container for continuously discharging liquid from the apparatus, but the whole problem was not solved by that finding. It was also necessary to provide some arrangement whereby the flow of liquid into the receiving container at all times is equal to the flow of liquid leaving the discharging container.

An apparatus of the kind here described may be assumed to be connected at its outlet to a machine which requires a certain flow of liquid per unit of time for its operation. Further, it may be assumed that between the outlet of the apparatus and said machine there is arranged a pump which continuously withdraws from the discharging container the flow of liquid required for the operation of the machine. Thus, in order to achieve a liquid flow into the receiving container of the apparatus which is equal to the discharged liquid flow, it would be possible to continuously sense a decreasing liquid volume in the discharging container of the apparatus and to use the resulting signal for controlling the liquid flow into the receiving container of the apparatus. With a control method, however, the flow of liquid into the receiving container must be controlled by means of a signal varying with reference to its magnitude (in this case it is decreasing), which is very unsuitable from the technical point of view. Moreover, the signal will increase rapidly in magnitude when the discharging container receives liquid from the discontinuously working unit of the apparatus which further disturbs the regulation and makes it less reliable.

Another possible method of control involves a flow meter installed at the outlet of the apparatus and which is arranged to give off a signal varying with the flow rate of liquid discharged from the discharging container, this signal being used to control the flow of liquid into the apparatus. It is true that this controlling signal will remain unchanged as long as the liquid flow discharged from the discharging container is constant, but it must be adjusted or corrected whenever the discharged liquid flow assumes a different rate. The error factor of a flow meter varies with the flow rate of liquid passing through it.

As the latter control method has also proved unsuitable for technical reasons, it has been found necessary to use a method in which a float arranged in the receiving container of the apparatus is caused to actuate a shutoff valve in the inlet conduit of the apparatus, so as to prevent the liquid from overflowing the edges of the receiving container. With this arrangement, the apparatus during operation discharges a continuous flow of liquid but receives a discontinuous flow of liquid.

The present invention provides a new method of controlling the flow of liquid through one of the two paths leading to the receiving container and leading from the discharging container of the discontinuously working apparatus, such control being dependent upon the continuous liquid flow through the other of these paths. The method is characterized in that values corresponding to the liquid quantities in the receiving container and the discharging container, or the liquid quantities in both these containers and the discontinuously working unit of the apparatus, are added to obtain a total value which is used to control the flow of liquid through one or the other of the aforesaid paths so as to arrest changes in the total value, whereby the liquid flows through the two paths are equalized.

From the technical point of view, the method according to the invention is fully acceptable as distinguished from the two methods previously described. The new method enables a regulation by means of a signal essentially unchanging in magnitude, namely, the signal corresponding to the sum of the liquid quantities in the receiving container and the discharge container, and possibly the liquid quantity in the discontinuously working unit of the apparatus. Further, the method according to the invention requires no adjustment or correction of the control signal when the external operating conditions for the apparatus are changed.

With the present invention, it is now possible to avoid the previously inevitable overdimensioning of the receiving and discharging containers, for the new method automatically prevents a continuous increase or decrease of the liquid quantities in these containers, caused by possible permanent errors in the sensing or measuring devices used.

Figure 2:
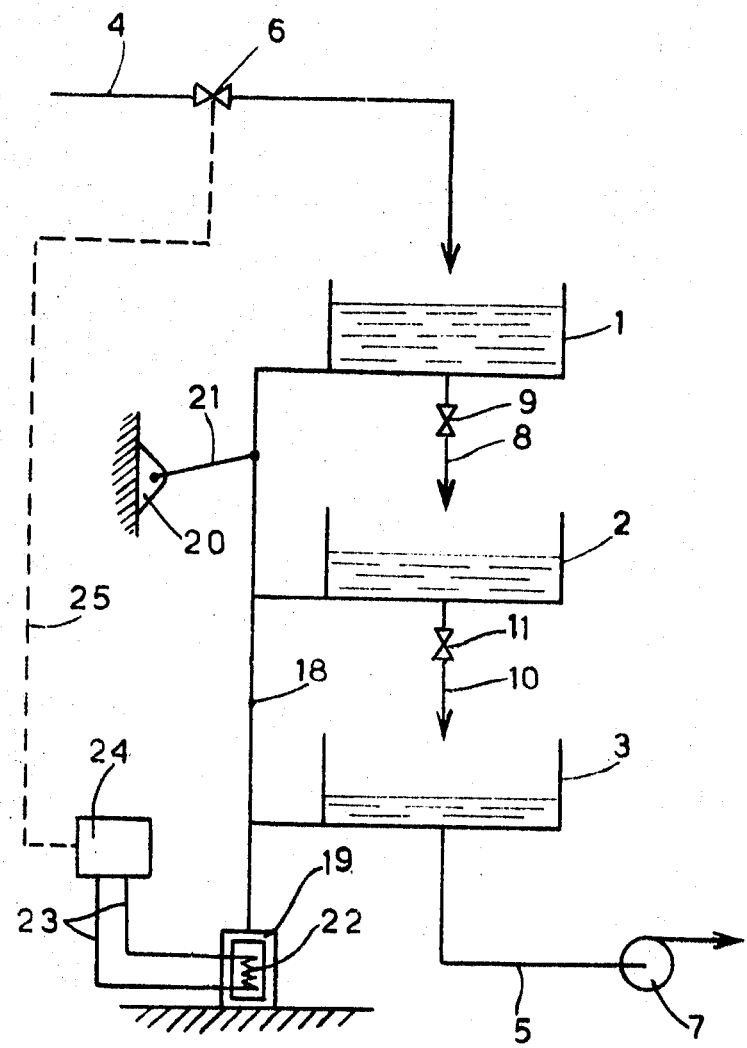

The present invention also relates to a system for performing the method described above. In the following, this system will be described in detail with reference to the accompanying drawings, in which FIGS. 1 and 2 are schematic views of two alternative embodiments of the system, chosen as examples only.

In the drawings, an apparatus is illustrated which comprises three containers 1, 2 and 3 arranged above each other. The uppermost container 1 receives a continuous flow of liquid through a conduit 4, while the lowest container discharges a continuous flow of liquid through a conduit 5. In the conduit 4 is an adjustable flow control valve 6, and in the conduit 5 is a centrifugal pump 7. By means of a shutoff valve 9, the container 1 is arranged to be connected with the container 2 through a conduit 8, the container 2 in turn, by means of a shutoff valve 11, being arranged to be connected to the container 3 through a conduit 10. The shutoff valves 9 and 11, which normally are closed, may be actuated by conventional means (not shown) in a manner such that at equal time intervals there is first a flow of liquid from the container 2 to the container 3 and then a flow of liquid from the container 1 to the container 2.

The above-described type of apparatus is used in many different connections where the container 2 serves as a treatment vessel of one kind or another, in which the liquid and generally one or more other substances are kept for a predetermined time. Such apparatus may also be used for weighing a continuously flowing liquid, in which case the container 2 is weighed each time when new liquid has been supplied to it, special means being arranged for automatically adding the values obtained.

The two illustrated systems for achieving the same liquid flow to the container 1 and from the container 3 will now be described.

In FIG. 1, two pressure-sensing instruments 12 and 13 are connected at a certain level to the containers 1 and 3, respectively. The pressures sensed by these instruments, which may be conventional, are dependent upon the liquid levels in the respective containers, and consequently are measures of the liquid quantities therein. Values corresponding to the sensed pressures and hence to the liquid quantities in the containers 1 and 2 are transmitted through lines 14 and 15 to a device 16 in which they are added. The device 16 also serves as a regulator which, when the added value tends to change, operates through a line 17 to adjust the flow determining valve 6 in the conduit 4. The device 16 may be any conventional device of the type adapted to provide a continuous signal of a magnitude which represents the sum of the two input values from the pressure-sensing instruments 12 and 13 and which governs a suitable actuator for controlling the valve 6 through line 17.

In the operation of the FIG. 1 embodiment, assume that the flow rate through discharge path 5 decreases relative to the flow rate through inlet path 4, thereby causing an increase in the sum of the liquid quantities in containers 1 and 3. This, of course, will increase the sum of the pressures sensed by the instruments 12 and 13 and thus increase the sum of the values added by the device 16. The resulting increase in the magnitude of the signal provided by this device will operate through line 17 to throttle the valve 6 and reduce the flow rate through inlet path 4 until there is a cessation of the increase in the sum of the liquid quantities in containers 1 and 3, it being understood that such increase is arrested when the flow rates through paths 4 and 5 are equalized. Conversely, if the flow rate through discharge path 5 increases relative to that through inlet path 4, the sum of the values added by the device 16 will decrease and thereby cause this device to actuate valve 6 in the directions for increasing the flow rate through inlet path 4 until it equals the flow rate through outlet path 5, thereby arresting the decrease in the sum of the values added by the device.

Since a change in the total liquid quantities in containers 1 and 3 produces an immediate adjustment of valve 6 in the direction for arresting the change, the sum of the liquid quantities in these containers will not vary substantially.

It will be noted that in the FIG. 1 embodiment, the instruments 12 and 13 in effect provide individual measurements of the liquid quantities in containers 1 and 3, respectively, these individual measurements being added at 16. In some cases, however, it may be desirable to obtain a value dependent upon the sum of the liquid quantities without measuring those quantities individually, and an example of a system functioning in this manner is illustrated in FIG. 2.

In FIG. 2, all of the containers 1, 2 and 3 are supported by a common rod 18 which rests on a base 19. The rod 18 is supported by a pivoting arm 21 which is hinged to a bracket 20 fixed to a wall or the like. On the base 19 a strain gauge 22 is placed, which through lines 23 is connected to a device 24. The strain gauge 22 transmits to the device 24, through lines 23, a signal (such as an electric current) which varies with the pressure to which the base 19 is loaded and consequently represents the total quantity of liquid in the containers 1, 2 and 3. The device 24 is arranged to adjust the valve 6 through a line 25 when the signal from the strain gauge 22 tends to change, this adjustment being similar to that described in connection with FIG. 1.

Only two embodiments of the invention have been described above. Several other embodiments are possible within the scope of the appended claims. For example, in the embodiment shown in FIG. 1, the container 2 can also be provided with a pressure sensing instrument connected to the device 16; and the arrangement in FIG. 2 can be modified by detaching the unit 2 from rod 18, so that valve 6 is controlled by the weight of only the containers 1 and 3. Also, in order to avoid erroneous control signals to the valve 6, suitable instruments (not shown) may be provided to break the connections 17 and 25, respectively, during the relatively short periods of time when the container 2 is emptied and filled again. The devices 16 and 24 are preferably constructed so that they sense a new reference value for the measured total liquid quantity after each emptying and filling of the container 2.

Instead of controlling the flow into the container 1, the flow leaving the container 3 can be controlled by the device 16 or 24, in which case this device may be operatively connected to a valve in the discharge path 5 rather than to the valve 6. With this modification, of course, the device 16 or 24 is arranged to throttle the valve in path 5 in response to a decrease in the sum of the added liquid quantities, and vice versa.

I claim:

1. In combination with an intermittently working apparatus including a receiving container, means forming an inlet for supplying liquid to said container, a unit to which liquid is supplied intermittently from the receiving container, and a discharging container for collecting and discharging liquid intermittently leaving said unit and having an outlet for the liquid, a system for maintaining equal and continuous flows of liquid to and from said apparatus, said system comprising means operatively connected to said apparatus for adding quantitative values including values corresponding to the quantities of liquid in said receiving and discharging containers, respectively, to obtain a total value dependent upon the sum of said quantities, and means operatively connected to said adding means for adjusting the flow through one of said inlet and outlet to arrest changes in said total value.

2. The combination according to claim 1, in which said quantitative values also include a value corresponding to the quantity of liquid in said unit.

3. The combination according to claim 1, in which said adding means include means for measuring the quantities of liquid in said containers, respectively, said adding means being operatively connected to the apparatus through said measuring means.

4. The combination according to claim 1, in which said adding means include a device for weighing said containers.